(12) United States Patent
Prisadnikov et al.

(10) Patent No.: US 11,386,349 B1
(45) Date of Patent: Jul. 12, 2022

(54) SYSTEMS AND METHODS FOR DISTINGUISHING HUMAN USERS FROM BOTS

(71) Applicant: Meta Platforms, Inc., Menlo Park, CA (US)

(72) Inventors: Nedyalko Prisadnikov, London (GB); Hüseyin Kerem Cevahir, London (GB)

(73) Assignee: Meta Platforms, Inc., Menlo Park, CA (US)

( * ) Notice: Subject to any disclaimer, the term of this patent is extended or adjusted under 35 U.S.C. 154(b) by 929 days.

(21) Appl. No.: 15/596,891

(22) Filed: May 16, 2017

(51) Int. Cl.
*G06N 20/00* (2019.01)
*G06N 5/02* (2006.01)

(52) U.S. Cl.
CPC ............... *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

| | | | | |
|---|---|---|---|---|
| 8,561,184 B1* | 10/2013 | Marsa | ..................... | H04L 67/22 726/22 |
| 2011/0320816 A1* | 12/2011 | Yao | ....................... | G06F 21/316 713/171 |
| 2013/0247192 A1* | 9/2013 | Krasser | ............... | H04L 63/1425 726/23 |
| 2016/0197918 A1* | 7/2016 | Turgeman | ............. | H04W 12/06 726/4 |
| 2017/0185758 A1* | 6/2017 | Oliker | ................... | G06F 21/316 |

OTHER PUBLICATIONS

Chavoshi, Nikan, Hossein Hamooni, and Abdullah Mueen. "Temporal patterns in bot activities." Proceedings of the 26th international conference on world wide web companion. 2017. (Year: 2017).*
Wang, Alex Hai. "Detecting spam bots in online social networking sites: a machine learning approach." IFIP Annual Conference on Data and Applications Security and Privacy. Springer, Berlin, Heidelberg, 2010. (Year: 2010).*
Gianvecchio, Steven, et al. "Measurement and Classification of Humans and Bots in Internet Chat." USENIX security symposium. 2008. (Year: 2008).*
Narang, Pratik, Vansh Khurana, and Chittaranjan Hota. "Machine-learning approaches for P2P botnet detection using signal-processing techniques." Proceedings of the 8th ACM International Conference on Distributed Event-Based Systems. 2014. (Year: 2014).*

* cited by examiner

*Primary Examiner* — Li B. Zhen
*Assistant Examiner* — Henry Nguyen
(74) *Attorney, Agent, or Firm* — Baker Botts L.L.P.

(57) ABSTRACT

In one embodiment, a system is configured to identify, based on predetermined criteria, a first set of users of an online system who belong to a population segment. The system may monitor activities performed by the first set of users on the online system over a predetermined period of time and store the monitored activities as time-series data. A feature set associated with the first set of users may be generated by transforming the time-series data into a frequency domain. The system may train a machine-learning model using the feature set and other feature sets to determine whether activities associated with a given set of users exhibit diurnal behavior pattern. Using the trained machine-learning model, the system may determine whether activities performed by a second set of users on the online system exhibit diurnal behavior pattern.

20 Claims, 10 Drawing Sheets

SYSTEMS AND METHODS FOR DISTINGUISHING HUMAN USERS FROM BOTS

TECHNICAL FIELD

This disclosure generally relates to using machine-learning to distinguish human users from non-human users, such as computer-implemented bots.

BACKGROUND

Online systems, such as social-networking websites and gaming platforms, allow users to engage with each other or with content or features provided by the online systems. For example, users of an online social-networking system may register a user account, login, and read and post messages. As another example, users of a gaming system may login to a virtual world and, often through an avatar, explore and interact with the virtual world. Such online systems are typically intended for human users. However, for various reasons, people may design bots to automate interactions with the systems. For example, a spammer wishing to distribute spam through a system may design a bot to automatically navigate the system, collect personal data of real users, and publish advertisements. As another example, in virtual gaming worlds where certain virtual objects (e.g., virtual currency, a rare weapon, etc.) have real-world value (e.g., there may be a real-world market where people are willing to pay for the virtual objects), bots are sometimes used to automatically "farm" such objects. Activities by bots, however, may negatively impact the intended user experience of these systems and compromise system integrity.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

The embodiments disclosed herein relate to systems and methods for identifying online activities that are performed by non-human users, such as bots. "Bots," as used herein, generally refer to a computer program or script designed to automate certain tasks and/or to emulate human activity. At a high level, the subject matter covered by this application takes advantage of the observation that human activity is typically diurnal. For example, users typically are more active during the day and less active late at night. Bots, on the other hand, may continue to operate throughout the day or on a schedule different from that of a typical human user. Based on this observation, a system may be configured to automatically determine whether users are likely to be bots or humans based on the observed behavior patterns. By enabling systems to automatically detect bots, systems may automate processes for combating bots and improve system integrity.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein relates to systems and methods for automatically determining whether users are likely to be bots or humans based on observed behavior patterns. In particular embodiments, monitored user activities may be captured as time-series data. In particular embodiments, the time-series data may be transformed into a frequency domain to simplify a machine-learning process. In particular embodiments, the resulting machine-learning model may be used to determine whether a group of users are likely to be (predominantly) human users or non-human users. In particular embodiments, the determination may further be used to label individual users as human or non-human, and such labeled user data may in turn be used to train another machine-learning model to determine whether individual users are likely to be human or non-human.

In particular embodiments, the collective behavior pattern of a population of users may be used to determine whether those users are likely to be predominantly bots. The activities of a population of users in a system (e.g., social-media network) may be monitored to gather activity data. Any types of activity may be tracked, such as registration, login, content consumption (e.g., requesting a post, viewing a message, clicking on an ad, etc.), content creation (e.g., comments, posts, "likes," uploading photos, sharing links, etc.), friend requests, and any other activity that may be performed on the system. A gaming system, for example, may allow users to register, login, navigate a virtual world, gather resources, fight enemies, and perform any other supported gaming actions. In particular embodiments, activity data may be gathered over a period of time and represented as a time series. For example, over the course of a predetermined time period (e.g., 1, 2, 7, or 10 days), the number of "hits" (e.g., the occurrence of an activity of interest, such as registration) observed within each predetermined time interval (e.g., 1, 10, 30, 60, 120-minute intervals) may be recorded. For instance, over the course of a week, registration and login activity may be monitored and logged in one-hour intervals, which means that there may be 7×24=168 data records. For example, during the first five one-hour intervals, the system may record 113 hits, 233 hits, 444 hits, 48 hits, 56 hits, respectively. Time-series data of a population may include non-human bot activities and human activities.

Figure 1A:
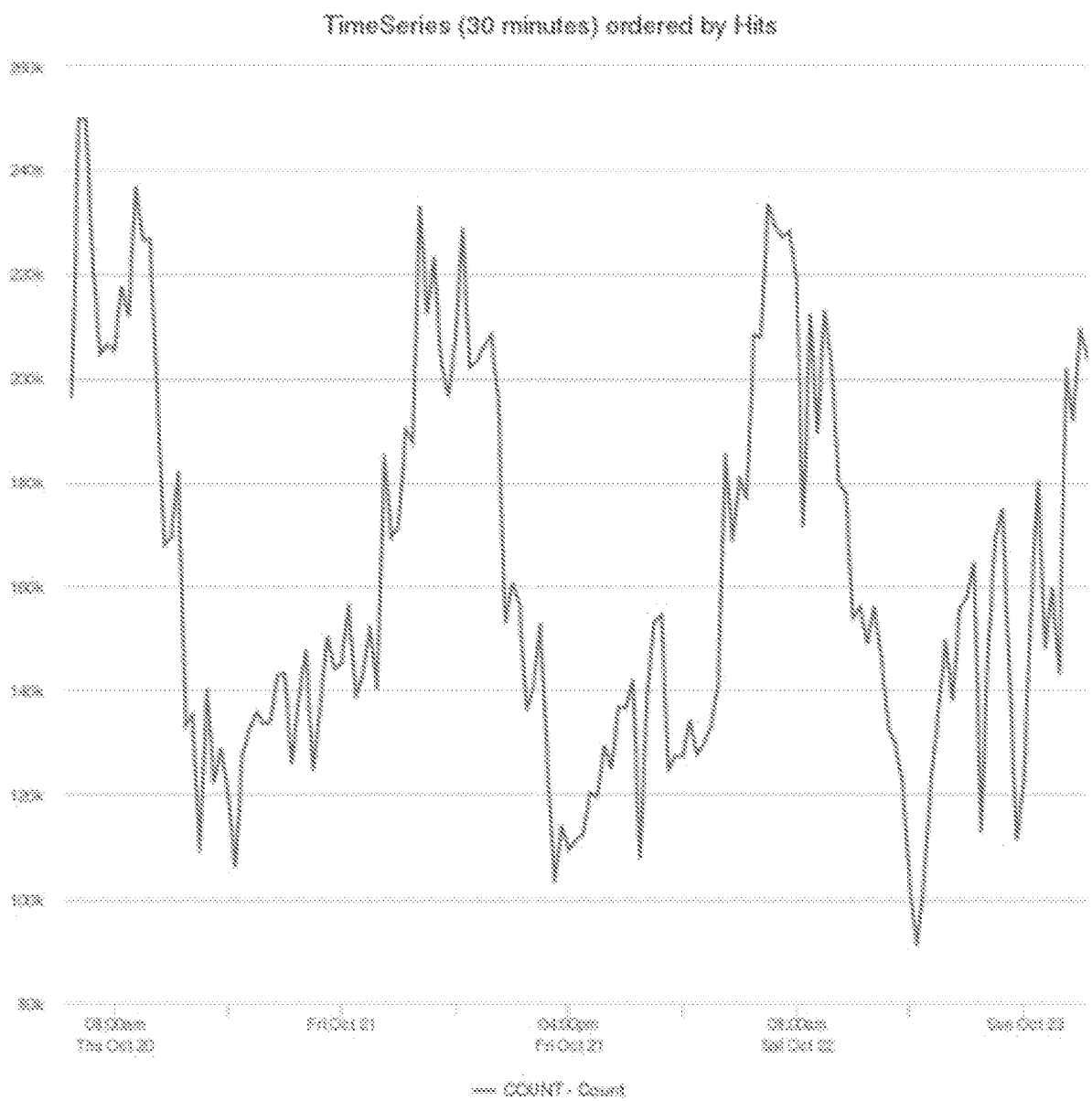
FIG. 1A illustrates an example graph of time-series data corresponding to activities performed by a population segment that includes both human and non-human (e.g., bots) users.
Figure 1B:
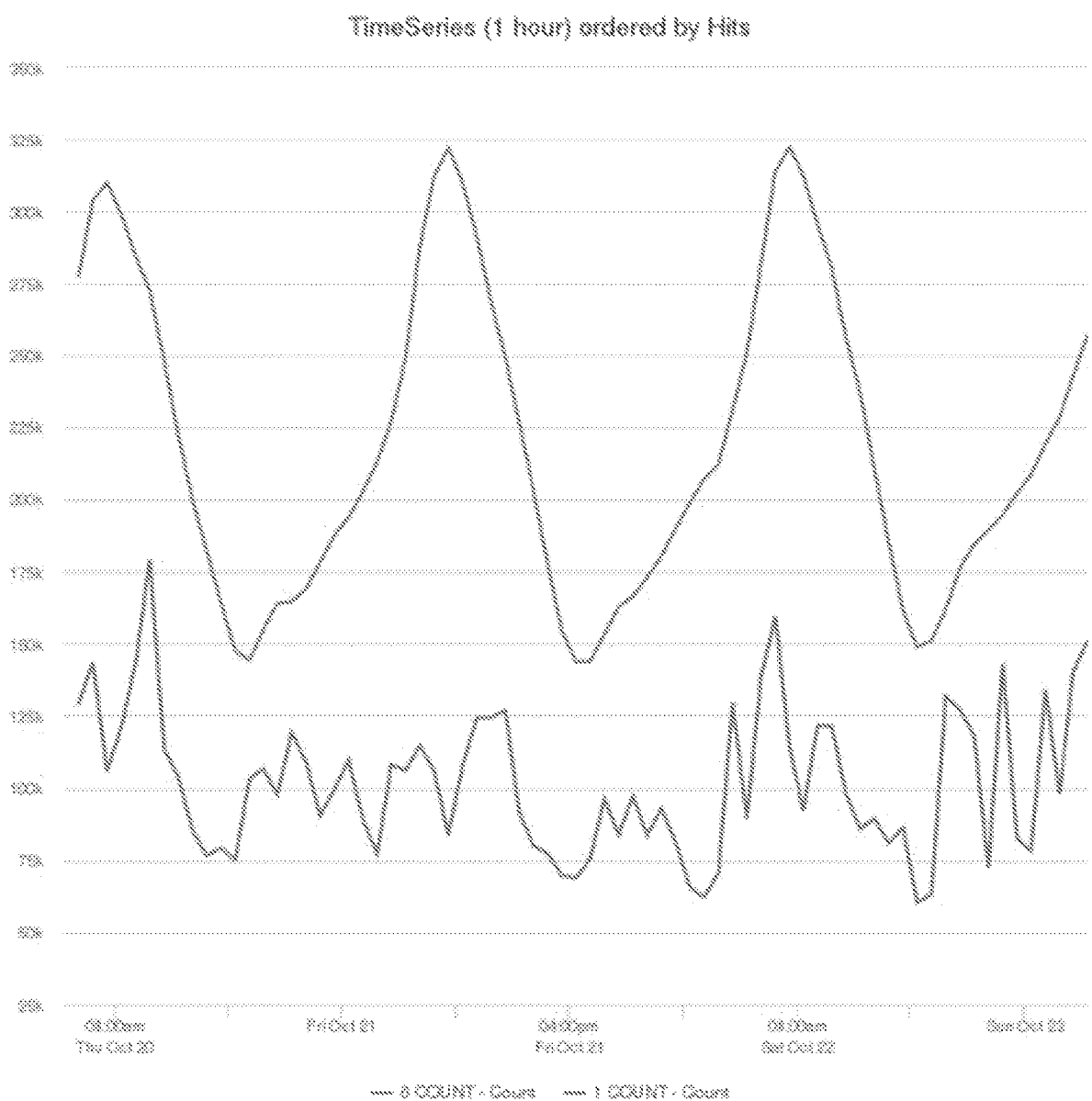
FIG. 1B illustrates an example graph of time-series data corresponding to activities performed by a population segment, where data associated with humans and data associated with non-humans (e.g., bots) are plotted separately.

In particular embodiments, the gathered data may be graphically represented as a time-series graph, such as the example shown in FIG. 1A. The horizontal axis represents time and the vertical axis represents the number of hits observed. The graph shown in FIG. 1A roughly exhibits a sinusoidal pattern. If the underlying data were to be separated into a data set associated with human activities and another data set associated with non-human (bot) activities, the two data sets may be plotted as shown in FIG. 1B. The graph shown on the top represents the data set of human activities and the bottom graph represents the data set of bot activities. The graph of human activities show a clear diurnal pattern (a pattern that recurs daily). This may be due to users' sleep/wake cycle as well as work/off-work schedule. In contrast, the graph of bot activities appear random and does not exhibit the diurnal pattern exhibited by the graph of human activities. This may be because machine-generated activities may operate automatically at any hours of the day and are not subject to typical human constraints and tendencies.

The monitored population usually is not homogenous—it typically contains a mix of real human users and bots. As such, a determination made for a given population may contain false-positives (e.g., if a non-homogenous population is labeled as bots, the human users would be false-positives). However, a sufficiently small number of false-positives may be tolerable. For instance, in particular embodiments where the determination result is used to label training data for subsequent machine-learning, the machine-learning algorithm may be able to tolerate some noise in the training data.

To minimize false-positives, particular embodiments may separate segments of the population based on some characteristics typically found to be associated with bots or in humans. One goal of the segmentation is to separate activities that were likely performed by humans from those by bots, so that each data set contains a sufficiently high concentration of activities by either bots or humans. Each data set may then be analyzed and collectively labeled (e.g., as bots or humans).

In particular embodiments, population segmentation may be based on any combination of characteristics that define a signature of a segment of the population. In particular embodiments, the characteristic used may include, for example, a user's country of origin, computer system information (e.g., OS platform, mobile device, IP), server/network communication and encryption protocol used to communicate with the online system (e.g., www, m_basic, api), metadata relating to the HTTP request used to communicate with the online system, actions performed (e.g., registration, login, friend request, posting content, or any other action that a user may perform in the system), among others. In particular embodiments, the characteristics used for segmentation may also include user's profile information and/or social graph information (e.g., connections or relationships with other users, activities performed, etc.). An example of a segmentation signature for bots may be: a user who is in country X, uses communication protocol Y, has HTTP metadata Z, has very little social-graph data, and has an email address that is likely fake (e.g., appears randomly generated), etc. In particular embodiments, the population that meets the segmentation criteria may be monitored as described above, and the corresponding time-series data may be stored.

Figure 2A:
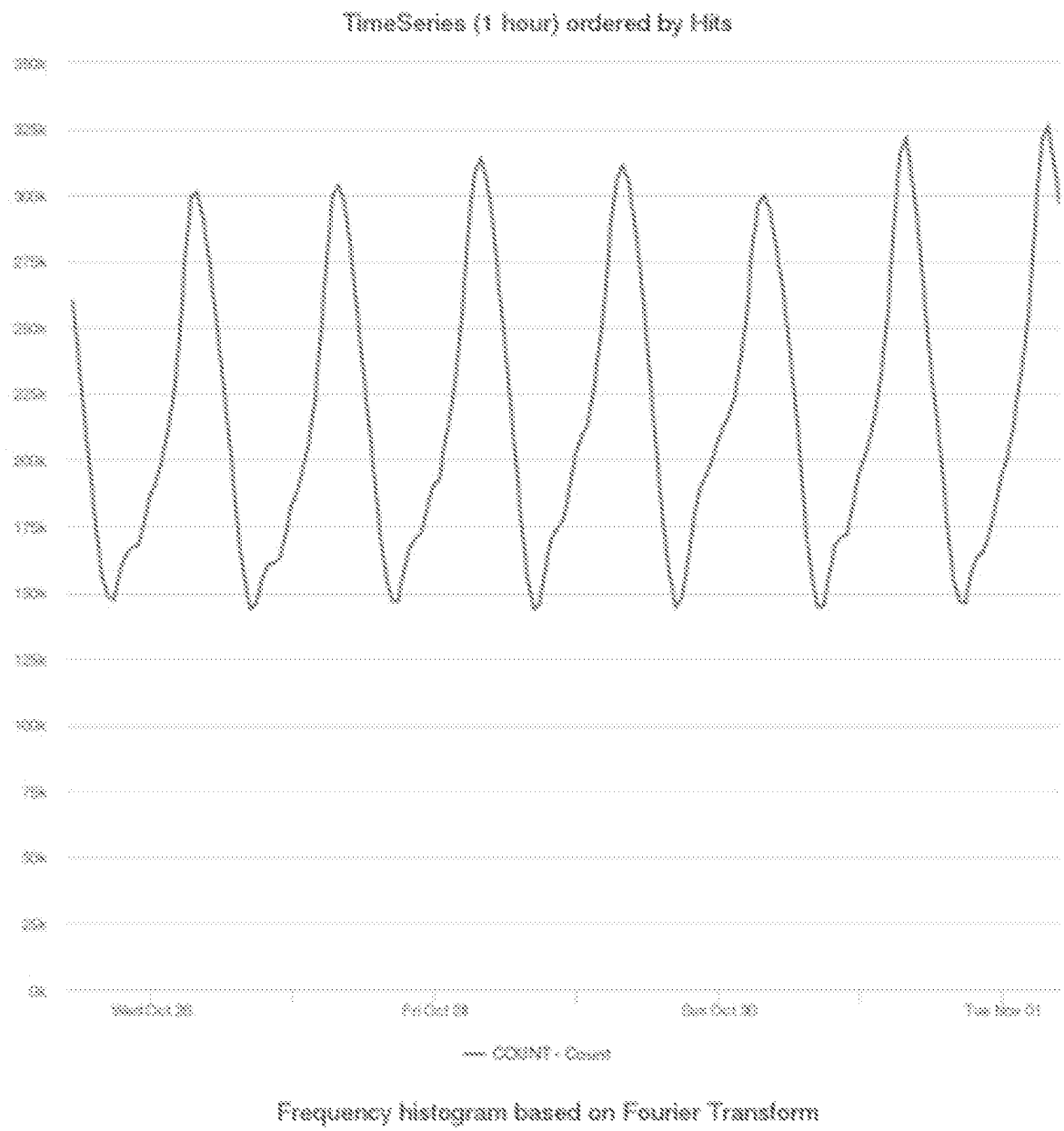
FIG. 2A illustrates an example graph of time-series data corresponding to activities performed by a population of human users.
Figure 2B:
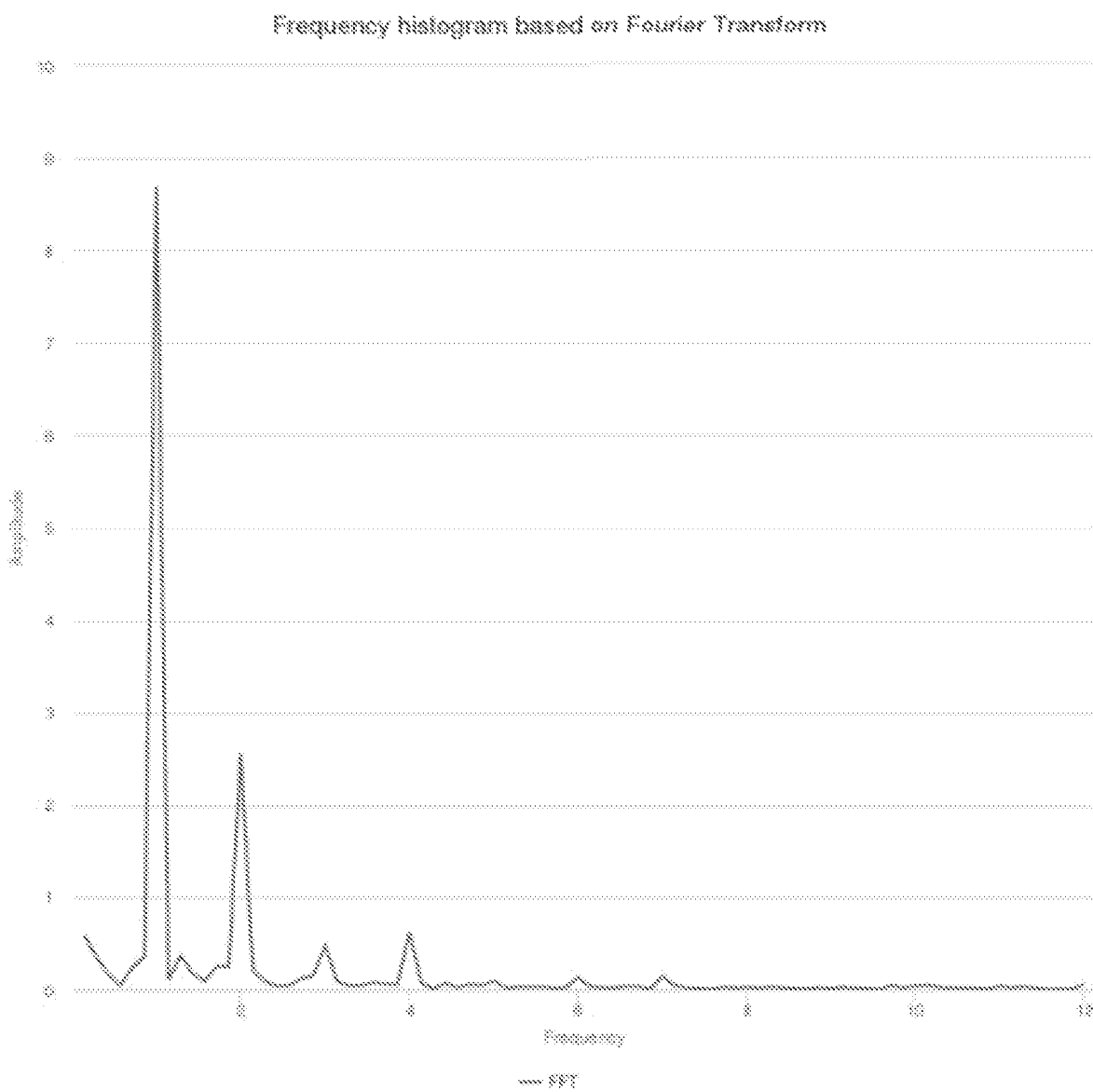
FIG. 2B illustrates an example graph of frequency-domain data corresponding to activities performed by a population of human users.
Figure 3A:
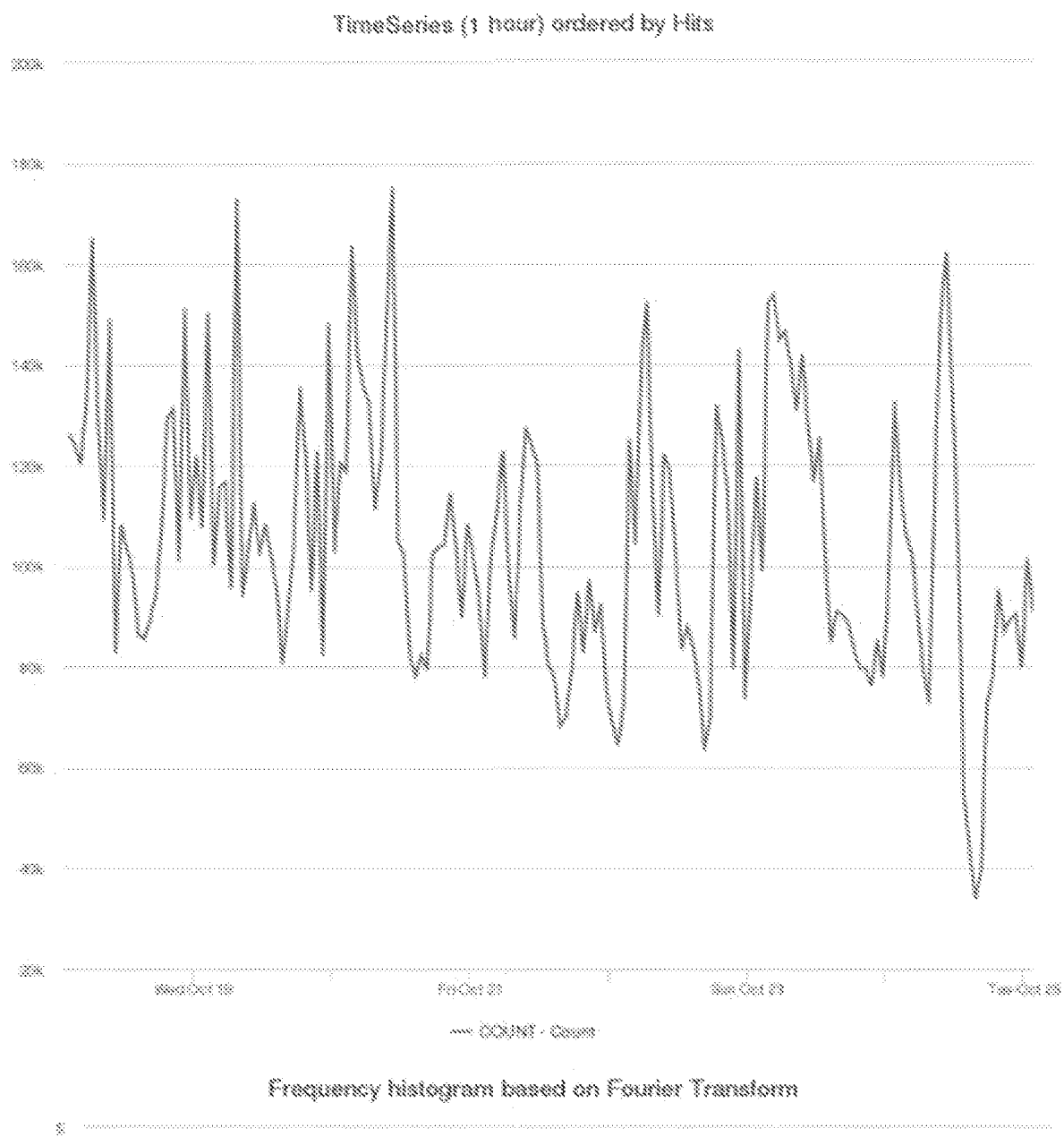
FIG. 3A illustrates an example graph of time-series data corresponding to activities performed by a population of non-human users (e.g., bots).
Figure 3B:
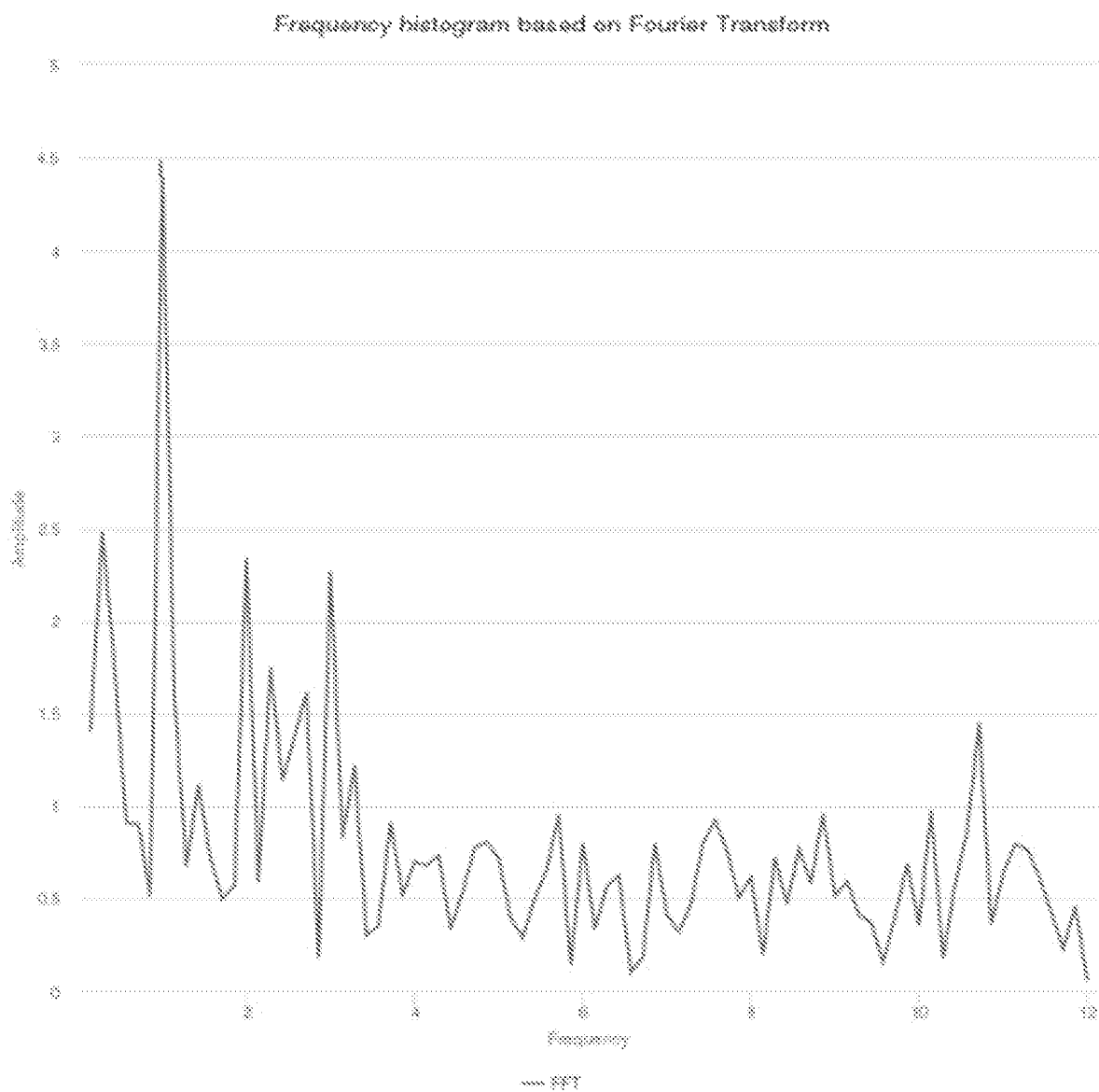
FIG. 3B illustrates an example graph of frequency-domain data corresponding to activities performed by a population of non-human users (e.g., bots).

In particular embodiments, the recorded time-series data may be transformed into a frequency domain. In particular embodiments, time-series data may be difficult to be processed and analyzed by machines. To simplify the problem for machine learning, the time-series data may be transformed into the frequency domain using, e.g., Fast Fourier Transform (FFT). As an example, FIG. 2A shows an example graphical representation of time-series data of human users, and FIG. 2B shows an example graphical representation (as a histogram) of the data transformed into the frequency domain. As another example, FIG. 3A shows an example graphical representation of time-series data of bots, and FIG. 3B shows an example graphical representation (as a histogram) of the data transformed into the frequency domain. It should be appreciated that the graph in FIG. 2B exhibits a much more concentrated pattern than the graph in FIG. 3B.

In particular embodiments, the frequency-domain data, represented in FIGS. 2B and 3B as histograms, may be used as a feature set or feature vector for the associated set of observed data, which in particular embodiments may be associated with a segment of the population. Stated differently, each population segment associated with the observed data may have an associated feature vector. In particular embodiments, the feature vector, along with other feature vectors associated with other populations, may be used as training data for a supervised machine-learning model. An example of a feature vector may be: [0.28295, 0.32766, 0.15847, 0.21622, 0.27772, 0.26667, 8. 06241, 0.24959, 0.21574, 0.09889, 0.15138, 0.21209, 0.11611, 3.92922, 0.07194, . . . ]. In particular embodiments, each feature vector may be labeled as either being associated with (1) diurnal behavior pattern or human behavior, or (2) non-diurnal behavior pattern or non-human/bot behavior. In particular embodiments, labeling for training purposes may be performed by human analysts. In particular embodiments, a suitable machine-learning model may be trained using n data sets, each of which may correspond to a population segment and associated with a feature vector and a label. Any suitable machine-learning algorithm may be used to learn from the training data to determine whether a given feature vector is likely to indicate (1) diurnal or human behavior, or (2) non-diurnal or bot behavior. Examples of machine-learning algorithms include, e.g., support vector model (SVM), k-means, neural networks, regression analysis of a linear combination of weighted features, etc.

In particular embodiments, the trained machine-learning model may be used to automatically determine whether a given set of observed data likely reflects (predominantly) bot activities or human activities. The observed data may be associated with a particular segment of the population based on any segmentation rule used (if any), as described above. The observed data may be gathered over a predetermined time period and the corresponding time-series data may be transformed into frequency-domain data. The frequency-domain data may in turn be input into the trained machine-learning model. In particular embodiments, the output of the model may be a confidence score indicating a likelihood of the input data reflecting (predominantly) bot activities or human activities. The determination result may then be used to label the associated population segment. For example, based on a feature vector associated with a population segment X, the machine-learning model may determine that population segment X exhibit non-diurnal behavior patterns. As such, population segment X may be assigned a label that corresponds to non-diurnal or non-human/bot behavior. If, on the other hand, the machine-learning model determination is that the activities reflect diurnal or human behavior, population segment X may be labeled accordingly. In particular embodiments, the labeling decision may be based on predetermined rules that take into consideration the confidence score output by the machine-learning model. For example, if the confidence score is above a certain threshold (e.g., more than 0.5, 0.7, 0.95, etc.) or within a particular range (e.g., between 0.5-1 or between 0.3-0.6), a predetermined label may be assigned (e.g., a numerical value corresponding to human, bot, or some other label in between to represent uncertainty).

In particular embodiments, labeled population segments using the process described above may be used as training data for another machine-learning model configured to determine whether a given individual user is likely human or non-human. In particular embodiments, the label assigned to each population segment may be propagated down to the user level. For example, each user who performed an action in that data set may be labeled as a bot or a human according to the label assigned to the population segment as a whole. For instance, if population segment X is assigned a "bot" (or "human") label, every user within the segment may also be labeled as a "bot" (or "human"). As discussed above, since a population segment may not be homogeneous, certain users within such a population would be mislabeled. However, this noise (i.e., the mislabeled data) may be absorbed by the machine-learning algorithm. In other words, while the user labeling may not be perfect (i.e., may contain false positives), it provides sufficiently good quality data set for machine learning training.

The user-level machine-learning model may be trained to determine whether an individual user (instead of a group of users) is likely to be a bot or a human. Any user feature may be used in this model, including, e.g., the user's login ID (whether it contains excessive numerals and symbols), country of origin, activity pattern, number of friends, types of activities performed, whether the user has uploaded any pictures, social-graph data, and any other data available in system. Such user feature data, which are readily available to the system, may be automatically labeled using the population-segment level machine-learning model, as described above. The labeled user data may thus serve as training data for the user-level machine-learning model. Any suitable machine-learning model may be used, such e.g., support vector model (SVM), k-means, neural networks, regression analysis of a linear combination of weighted features, etc. Once trained, the user-level machine-learning model may be used to take as input a given user's features and output a determination that reflects a likelihood of that user being a human or a bot.

Figure 4:
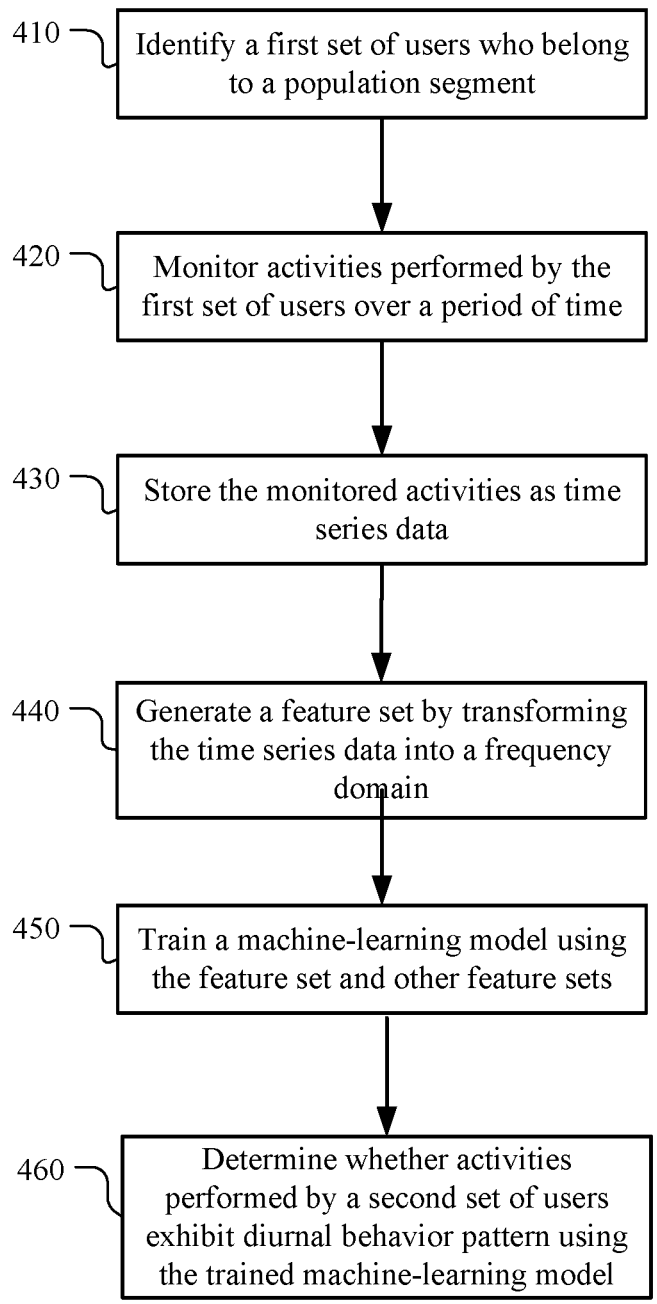
FIG. 4 illustrates an example method for identifying human users (e.g., evidenced by diurnal behavior) and non-human/bot users (e.g., evidenced by non-diurnal behavior).

FIG. 4 illustrates an example method 400 for predicting/determining whether activities performed by a set of users exhibit diurnal behavior pattern. For example, the method may begin at step 410, where a computing system may identify, based on predetermined criteria, a first set of users of an online system who belong to a population segment. At step 420, the system may monitor activities performed by the first set of users on the online system over a predetermined period of time. At step 430, the system may store the monitored activities as time-series data. At step 440, the system may generate a feature set associated with the first set of users by transforming the time-series data into a frequency domain. At step 450, the system may train a machine-learning model using the feature set and a plurality of other feature sets. The machine-learning model is configured to determine whether activities associated with a given set of users exhibit diurnal behavior pattern. At step 460, the system may use the trained machine-learning model to determine whether activities performed by a second set of users on the online system exhibit diurnal behavior pattern. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining whether user activities exhibit diurnal behavior pattern, including the particular steps of the method of FIG. 4, this disclosure contemplates any suitable method for determining whether user activities exhibit diurnal behavior pattern, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
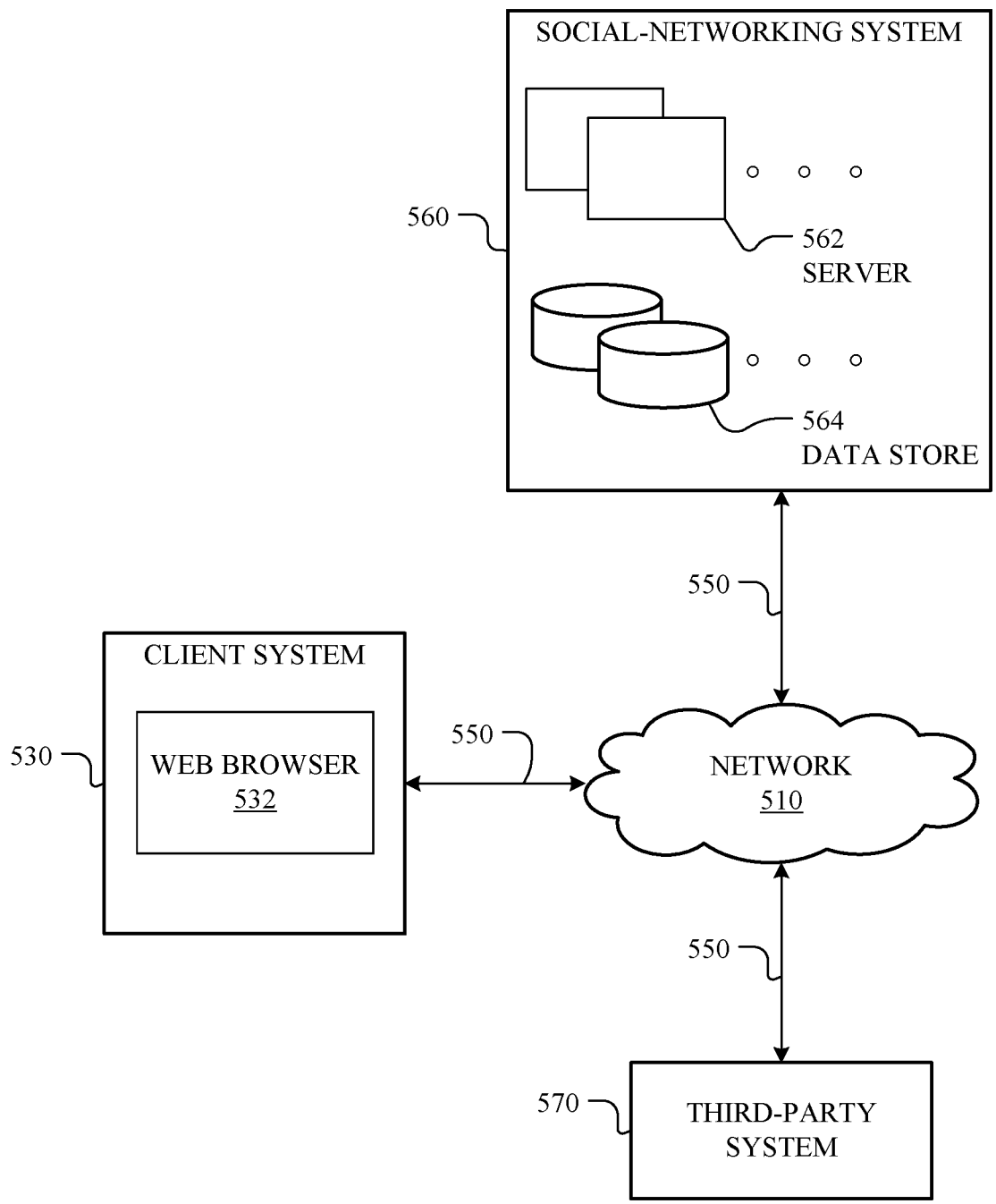
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
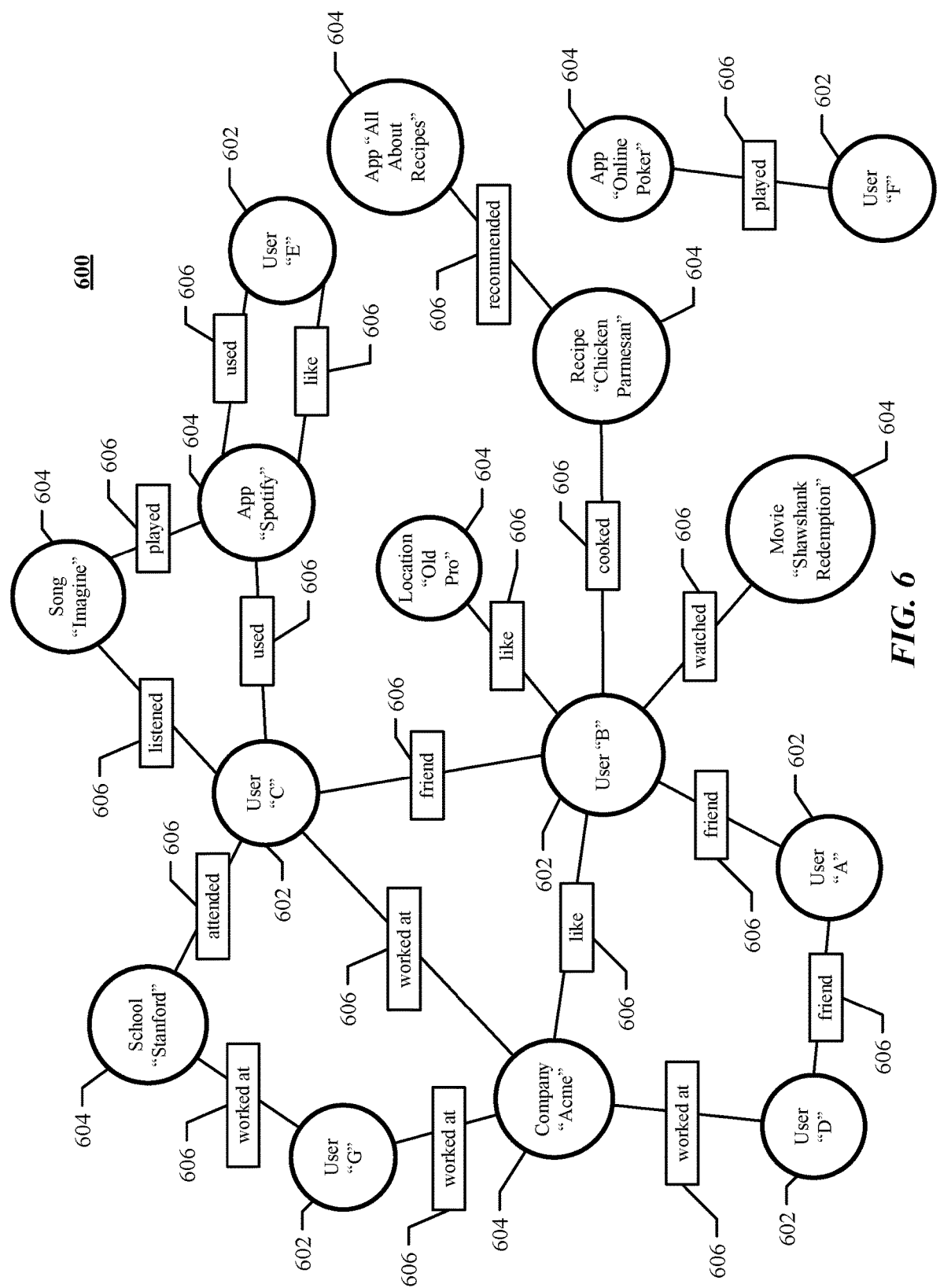
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 560). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 560 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 560) or RSVP (e.g., through social-networking system 560) to an event associated with the advertisement. In addition or as an alternative, an advertisement may include social-networking-system content directed to the user. As an example and not by way of limitation, an advertisement may display information about a friend of the user within social-networking system 560 who has taken an action associated with the subject matter of the advertisement.

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 530 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 560 or shared with other systems (e.g., third-party system 570). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 562 may be authorization/privacy servers for enforcing privacy settings. In response to a request from a user (or other entity) for a particular object stored in a data store 564, social-networking system 560 may send a request to the data store 564 for the object. The request may identify the user associated with the request and may only be sent to the user (or a client system 530 of the user) if the authorization server determines that the user is authorized to access the object based on the privacy settings associated with the object. If the requesting user is not authorized to access the object, the authorization server may prevent the requested object from being retrieved from the data store 564, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
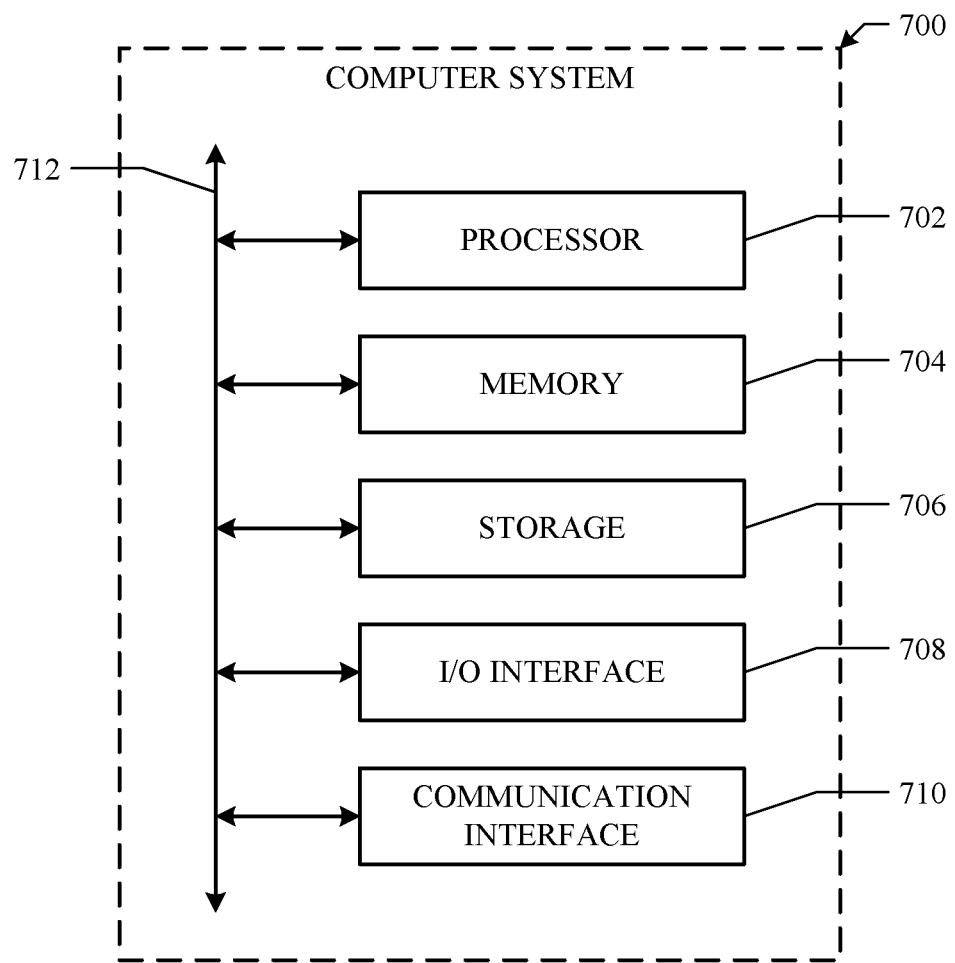

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, identifying, based on predetermined criteria, a first set of users of an online social-networking system as belonging to a first population segment and a second set of users of the online social-networking system as belonging to a second population segment;
   by the computing device, in response to identifying the first set of users of the online social-networking system as belonging to the first population segment and the second set of users of the online social-networking system as belonging to the second population segment, monitoring account registration or login activities performed on the online social-networking system over a predetermined period of time by (1) the first set of users who are identified as belonging to the first population segment and (2) the second set of users who are identified as belonging to the second population segment that is different from the first population segment;

by the computing device, storing, as time series data, the monitored account registration or login activities performed on the online social-networking system over the predetermined period of time by (1) the first set of users who are identified as belonging to the first population segment and (2) the second set of users who are identified as belonging to the second population segment, wherein the account registration or login activities on the online social-networking system of two different population segments over the predetermined period of time are monitored and stored for training a machine-learning model for determining whether activities associated with a given set of users exhibit diurnal behavior pattern or non-diurnal behavior pattern;

by the computing device, generating a first feature set associated with the first set of users and a second feature set associated with the second set of users by transforming the time-series data associated with each of the first and second population segments into frequency-domain data;

by the computing device, using the frequency-domain data associated with each of the first and second population segments as training data for training the machine-learning model for determining whether activities associated with the given set of users exhibit diurnal behavior pattern or non-diurnal behavior pattern, the frequency-domain data for training the machine-learning model comprising (1) the first feature set associated with the first population segment that exhibits diurnal behavior pattern reflecting account registration or login activities performed on the social-networking system daily and during a first time schedule and (2) the second feature set associated with the second population segment that exhibits non-diurnal behavior pattern reflecting account registration or login activities performed on the social-networking system during a second time schedule that is different from the first time schedule of the first population segment; and by the computing device, determining, using the trained machine-learning model, whether activities performed by a third set of users on the online social-networking system exhibit diurnal behavior pattern or non-diurnal behavior pattern.

2. The method of claim 1, further comprising:
generating a third feature set associated with the third set of users by transforming time-series data associated with the third set of users into the frequency-domain data; and
inputting the third feature set into the trained machine-learning model.

3. The method of claim 1,
wherein diurnal behavior pattern represents behavior pattern of humans; and
wherein non-diurnal behavior pattern represents behavior pattern of bots.

4. The method of claim 1, wherein the time-series data is transformed into the frequency-domain data using Fast Fourier Transform.

5. The method of claim 1, wherein the trained machine-learning model is configured to output a confidence score indicating a likelihood that activities associated with the given set of users exhibit diurnal behavior pattern.

6. The method of claim 1, further comprising:
determining a label based on the determining of whether the activities performed by the third set of users on the online social-networking system exhibit diurnal behavior pattern or non-diurnal behavior pattern; and
labeling each user in the third set of users using the label.

7. The method of claim 6, further comprising:
accessing features associated with each labeled user in the third set of users; and
training a second machine-learning model using the accessed features and the label of each labeled user, wherein the second machine-learning model is configured to determine whether a given user is human.

8. The method of claim 1, wherein social-graph data associated with the second population segment exhibiting non-diurnal behavior pattern is relatively lower than social-graph data associated with the first population segment exhibiting diurnal behavior pattern.

9. One or more computer-readable non-transitory storage media embodying software that is operable when executed to:
identify, based on predetermined criteria, a first set of users of an online social-networking system as belonging to a first population segment and a second set of users of the online social-networking system as belonging to a second population segment;
in response to identifying the first set of users of the online social-networking system as belonging to the first population segment and the second set of users of the online social-networking system as belonging to the second population segment, monitor account registration or login activities performed on the online social-networking system over a predetermined period of time by (1) the first set of users who are identified as belonging to the first population segment and (2) the second set of users who are identified as belonging to the second population segment that is different from the first population segment;
store, as time series data, the monitored account registration or login activities performed on the online social-networking system over the predetermined period of time by (1) the first set of users who are identified as belonging to the first population segment and (2) the second set of users who are identified as belonging to the second population segment, wherein the account registration or login activities on the online social-networking system of two different population segments over the predetermined period of time are monitored and stored for training a machine-learning model for determining whether activities associated with a given set of users exhibit diurnal behavior pattern or non-diurnal behavior pattern;
generate a first feature set associated with the first set of users and a second feature set associated with the second set of users by transforming the time-series data associated with each of the first and second population segments into frequency-domain data;
using the frequency-domain data associated with each of the first and second population segments as training data to train the machine-learning model for determining whether activities associated with the given set of users exhibit diurnal behavior pattern or non-diurnal behavior pattern, the frequency-domain data for training the machine-learning model comprising (1) the first feature set associated with the first population segment that exhibits diurnal behavior pattern reflecting account registration or login activities performed on the social-networking system daily and during a first time schedule and (2) the second feature set associated with the second population segment that exhibits non-diurnal behavior pattern reflecting account registration or login activities performed on the social-networking system during a second time schedule that is different from the first time schedule of the first population segment; and determine, using the trained machine-learning model, whether activities performed by a third set of users on the online social-networking system exhibit diurnal behavior pattern or non-diurnal behavior pattern.

10. The media of claim 9, wherein the software is further operable when executed to:

generate a third feature set associated with the third set of users by transforming time-series data associated with the third set of users into the frequency-domain data; and input the third feature set into the trained machine-learning model.

11. The media of claim 9, wherein the trained machine-learning model is configured to output a confidence score indicating a likelihood that activities associated with the given set of users exhibit diurnal behavior pattern.

12. The media of claim 9, wherein the software is further operable when executed to:

determine a label based on the determining of whether the activities performed by the third set of users on the online social-networking system exhibit diurnal behavior pattern or non-diurnal behavior pattern; and label each user in the third set of users using the label.

13. The media of claim 12, wherein the software is further operable when executed to:

access features associated with each labeled user in the third set of users; and train a second machine-learning model using the accessed features and the label of each labeled user, wherein the second machine-learning model is configured to determine whether a given user is human.

14. The media of claim 9, wherein social-graph data associated with the second population segment exhibiting non-diurnal behavior pattern is relatively lower than social-graph data associated with the first population segment exhibiting diurnal behavior pattern.

15. A system comprising: one or more processors; and a memory coupled to the processors comprising instructions executable by the processors, the processors being operable when executing the instructions to:

identify, based on predetermined criteria, a first set of users of an online social-networking system as belonging to a first population segment and a second set of users of the online social-networking system as belonging to a second population segment;

in response to identifying the first set of users of the online social-networking system as belonging to the first population segment and the second set of users of the online social-networking system as belonging to the second population segment, monitor account registration or login activities performed on the online social-networking system over a predetermined period of time by (1) the first set of users who are identified as belonging to the first population segment and (2) the second set of users who are identified as belonging to the second population segment that is different from the first population segment;

store, as time series data, the monitored account registration or login activities performed on the online social-networking system over the predetermined period of time by (1) the first set of users who are identified as belonging to the first population segment and (2) the second set of users who are identified as belonging to the second population segment, wherein the account registration or login activities on the online social-networking system of two different population segments over the predetermined period of time are monitored and stored for training a machine-learning model for determining whether activities associated with a given set of users exhibit diurnal behavior pattern or non-diurnal behavior pattern;

generate a first feature set associated with the first set of users and a second feature set associated with the second set of users by transforming the time-series data associated with each of the first and second population segments into frequency-domain data;

using the frequency-domain data associated with each of the first and second population segments as training data to train the machine-learning model for determining whether activities associated with the given set of users exhibit diurnal behavior pattern or non-diurnal behavior pattern, the frequency-domain data for training the machine-learning model comprising (1) the first feature set associated with the first population segment that exhibits diurnal behavior pattern reflecting account registration or login activities performed on the social-networking system daily and during a first time schedule and (2) the second feature set associated with the second population segment that exhibits non-diurnal behavior pattern reflecting account registration or login activities performed on the social-networking system during a second time schedule that is different from the first time schedule of the first population segment; and determine, using the trained machine-learning model, whether activities performed by a third set of users on the online social-networking system exhibit diurnal behavior pattern or non-diurnal behavior pattern.

16. The system of claim 15, wherein the processors are further operable when executing the instructions to:

generate a third feature set associated with the third set of users by transforming time-series data associated with the third set of users into the frequency-domain data; and input the third feature set into the trained machine-learning model.

17. The system of claim 15, wherein the trained machine-learning model is configured to output a confidence score indicating a likelihood that activities associated with the given set of users exhibit diurnal behavior pattern.

18. The system of claim 15, wherein the processors are further operable when executing the instructions to:

determine a label based on the determining of whether the activities performed by the third set of users on the online social-networking system exhibit diurnal behavior pattern or non-diurnal behavior pattern; and label each user in the third set of users using the label.

19. The system of claim 18, wherein the processors are further operable when executing the instructions to:

access features associated with each labeled user in the third set of users; and train a second machine-learning model using the accessed features and the label of each labeled user, wherein the second machine-learning model is configured to determine whether a given user is human.

20. The system of claim 15, wherein social-graph data associated with the second population segment exhibiting non-diurnal behavior pattern is relatively lower than social-graph data associated with the first population segment exhibiting diurnal behavior pattern.

\* \* \* \* \*